US010235783B2

United States Patent
Zeyl et al.

(10) Patent No.: US 10,235,783 B2
(45) Date of Patent: Mar. 19, 2019

(54) SYSTEM AND METHOD FOR VISUALIZATION OF A COMPUTE WORKFLOW

(71) Applicants: Timothy Zeyl, Toronto (CA); Shane Anthony Bergsma, Toronto (CA)

(72) Inventors: Timothy Zeyl, Toronto (CA); Shane Anthony Bergsma, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/388,549

(22) Filed: Dec. 22, 2016

(65) Prior Publication Data
US 2018/0182136 A1    Jun. 28, 2018

(51) Int. Cl.
*G06T 11/20* (2006.01)
*G06F 9/50* (2006.01)
*G06F 17/30* (2006.01)

(52) U.S. Cl.
CPC ......... *G06T 11/206* (2013.01); *G06F 9/5027* (2013.01); *G06F 17/30958* (2013.01)

(58) Field of Classification Search
CPC .... G06T 11/206; G06F 3/0481; G06F 17/246; G06F 3/04845; H04L 12/2458; G06Q 10/10; G06Q 30/06; G06Q 40/04; G09G 5/222
See application file for complete search history.

(56) References Cited

U.S. PATENT DOCUMENTS

| | | | |
|---|---|---|---|
| 7,506,302 B2* | 3/2009 | Bahrami | G06Q 10/067 717/100 |
| 2009/0088875 A1* | 4/2009 | Baier | G05B 19/41865 700/83 |
| 2011/0154294 A1 | 6/2011 | Cormack et al. | |
| 2013/0311242 A1 | 11/2013 | Duftler et al. | |
| 2014/0236651 A1 | 8/2014 | Sherer et al. | |
| 2016/0019477 A1* | 1/2016 | Reida | G06Q 10/0633 705/7.27 |

(Continued)

FOREIGN PATENT DOCUMENTS

CN    103617486 A    3/2014

OTHER PUBLICATIONS

Verma et al., "ARIA: Automatic Resource Interference and Allocation for MapReduce Environments", ICAC'11, Jun. 14-18, 2011.
(Continued)

*Primary Examiner* — Todd Buttram
(74) *Attorney, Agent, or Firm* — Norton Rose Fulbright Canada LLP

(57) ABSTRACT

A system and method for visualization of a compute workflow are provided. Workflow data indicative of one or more jobs executed in each computation stage of each instance of the compute workflow and job data indicative of one or more tasks executed by each of the one or more jobs are obtained. Each of the one or more tasks is associated with a corresponding computation stage. For each instance of the compute workflow, a visual representation of a resource utilization over time of each of the one or more tasks executed in each computation stage is generated. The visual representation is rendered for multiple instances of the compute workflow on a common timeline.

20 Claims, 15 Drawing Sheets

(56) References Cited

U.S. PATENT DOCUMENTS

2016/0313874 A1* 10/2016 Mikheev ............ G06Q 10/0633
2017/0315848 A1* 11/2017 Kung .................... G06F 9/5055

OTHER PUBLICATIONS

Andrew Or, "Understanding your Apache Spark Application Through Visualization", "Timeline View of Spark Events", https://databricks.com/blog/2015/06/22/understanding-your-spark-application-through-visualization.html, posted Jun. 22, 2015, retrieved Jan. 31, 2017.
"Ambari 2.1.2 Views Guide", Chapter 4, Figure 4.6, http://pivotalhd.docs.pivotal.io/docs/views-guide-ambari-2.1.2.html, retrieved Jan. 31, 2017.
Daniel C. Weeks, "Invisio: Visualizing Hadoop Performance", "Visualizing Job Performance", http://techblog.netflix.com/2014/09/inviso-visualizing-hadoop-performance.html, published Sep. 25, 2014, retrieved Jan. 31, 2017.

* cited by examiner

SYSTEM AND METHOD FOR VISUALIZATION OF A COMPUTE WORKFLOW

FIELD

Embodiments described herein generally relate to the field of compute workflows, more particularly to visualization of a compute workflow.

BACKGROUND

Compute workflows consist of multiple interdependent compute tasks that run in a distributed computing cluster. Due to the complexity of workflows, it is desirable to provide cluster operators with tools to understand anomalies and track daily performance so as to ensure that deadlines are met and resources fully utilized. Although several cluster visualization tools have been proposed, existing solutions do not display the multiple levels of abstraction (e.g. workflow level, computation stage level, task level) that workflows typically comprise. Instead, one level of abstraction is usually presented at any given time and a click-through paradigm is often required to visualize different levels of abstraction. This in turn makes it difficult for operators to readily obtain a complete understanding of performance of a given workflow or to historically compare workflows.

There is therefore a need for an improved system and method for visualization of a compute workflow.

SUMMARY

In accordance with one aspect, there is provided a method for visualization of a compute workflow. The method comprises obtaining workflow data indicative of one or more jobs executed in each computation stage of each instance of the compute workflow and job data indicative of one or more tasks executed by each of the one or more jobs; associating each of the one or more tasks with a corresponding computation stage; generating, for each instance of the compute workflow, a visual representation of a resource utilization over time of each of the one or more tasks executed in each computation stage; and rendering the visual representation for multiple instances of the compute workflow on a common timeline.

In some example embodiments, obtaining the workflow data may comprise parsing one or more workflow log files to obtain a directed acyclic graph representative of a sequence of the one or more jobs and obtaining the job data comprises parsing one or more job log files to obtain an identification of the one or more tasks.

In some example embodiments, generating the visual representation may comprise representing each of the one or more tasks as a shape having a first dimension along a first axis of a two-dimensional coordinate system and a second dimension along a second axis of the two-dimensional coordinate system, the first dimension corresponding to a duration of each of the one or more tasks and the second dimension corresponding to an amount of resources used by each of the one or more tasks.

In some example embodiments, generating the visual representation may comprise, for each computation stage, positioning multiple ones of the shape adjacent to one another along the second axis according to one of a start time of each of the one or more tasks, the duration of each of the one or more tasks, and a computing host on which each of the one or more tasks is implemented.

In some example embodiments, generating the visual representation may comprise generating, for each instance of the compute workflow, a plot comprising multiple graphical elements simultaneously rendered in the two-dimensional coordinate system, each graphical element representative of a given computation stage and comprising the multiple ones of the shape positioned adjacent to one another along the second axis.

In some example embodiments, computation stages running in series may be rendered as graphical elements positioned adjacent to one another along the first axis and computation stages running in parallel are rendered as graphical elements positioned adjacent to one another along the second axis.

In some example embodiments, rendering the visual representation for multiple instances of the compute workflow on a common timeline may comprise simultaneously rendering multiple ones of the plot in an integrated view.

In some example embodiments, generating the visual representation may comprise transforming the multiple ones of the shape into a polygon and rendering the polygon in the two-dimensional coordinate system.

In some example embodiments, generating the visual representation may comprise, for each computation stage, enclosing the multiple ones of the shape with an outline delimiting the start time of an earliest one of the one or more tasks to start and an end time of a last one of the one or more tasks to finish.

In some example embodiments, generating the visual representation may comprise, for each computation stage, enclosing the multiple ones of the shape with an outline delimiting a submission time for a given one of the one or more jobs executing the one or more tasks and a finish time for the given one of the one or more jobs.

In some example embodiments, generating the visual representation may comprise representing each of the one or more tasks in the two-dimensional coordinate system with the second axis in logarithmic scale.

In accordance with another aspect, there is provided a system for visualization of a compute workflow. The system comprises at least one processing unit; and a non-transitory memory communicatively coupled to the at least one processing unit and comprising computer-readable program instructions executable by the at least one processing unit for obtaining workflow data indicative of one or more jobs executed in each computation stage of each instance of the compute workflow and job data indicative of one or more tasks executed by each of the one or more jobs; associating each of the one or more tasks with a corresponding computation stage; generating, for each instance of the compute workflow, a visual representation of a resource utilization over time of each of the one or more tasks executed in each computation stage; and rendering the visual representation for multiple instances of the compute workflow on a common timeline.

In some example embodiments, the computer-readable program instructions may be executable by the at least one processing unit for obtaining the workflow data comprising parsing one or more workflow log files to obtain a directed acyclic graph representative of a sequence of the one or more jobs and for obtaining the job data comprising parsing one or more job log files to obtain an identification of the one or more tasks.

In some example embodiments, the computer-readable program instructions may be executable by the at least one processing unit for generating the visual representation comprising representing each of the one or more tasks as a shape having a first dimension along a first axis of a two-dimensional coordinate system and a second dimension along a second axis of the two-dimensional coordinate system, the first dimension corresponding to a duration of each of the one or more tasks and the second dimension corresponding to an amount of resources used by each of the one or more tasks.

In some example embodiments, the computer-readable program instructions may be executable by the at least one processing unit for generating the visual representation comprising, for each computation stage, positioning multiple ones of the shape adjacent to one another along the second axis according to one of a start time of each of the one or more tasks, the duration of each of the one or more tasks, and a computing host on which each of the one or more tasks is implemented.

In some example embodiments, the computer-readable program instructions may be executable by the at least one processing unit for generating, for each instance of the compute workflow, a plot comprising multiple graphical elements simultaneously rendered in the two-dimensional coordinate system, each graphical element representative of a given computation stage and comprising the multiple ones of the shape positioned adjacent to one another along the second axis.

In some example embodiments, the computer-readable program instructions may be executable by the at least one processing unit for rendering computation stages running in series as graphical elements positioned adjacent to one another along the first axis and rendering computation stages running in parallel as graphical elements positioned adjacent to one another along the second axis.

In some example embodiments, the computer-readable program instructions may be executable by the at least one processing unit for rendering the visual representation for multiple instances of the compute workflow on a common timeline comprising simultaneously rendering multiple ones of the plot in an integrated view.

In some example embodiments, the computer-readable program instructions may be executable by the at least one processing unit for transforming the multiple ones of the shape into a polygon and rendering the polygon in the two-dimensional coordinate system.

In some example embodiments, the computer-readable program instructions may be executable by the at least one processing unit for representing each of the one or more tasks in the two-dimensional coordinate system with the second axis in logarithmic scale.

In accordance with another aspect, there is provided a method for visualization of a compute workflow. The method comprises representing one or more tasks of the compute workflow as a plurality of adjacent shapes in a two-dimensional coordinate system, each shape having a first dimension along a first axis of the two-dimensional coordinate system and a second dimension along a second axis of the two-dimensional coordinate system, the first dimension corresponding to a duration of a given one of the one or more tasks and the second dimension corresponding to an amount of resources used by the given one of the one or more tasks; transforming the plurality of shapes into a polygon; and plotting the polygon in the two-dimensional coordinate system.

In some example embodiments, representing the one or more tasks may comprise positioning a first endpoint of each shape at a first coordinate on the first axis and positioning a second endpoint of each shape at a second coordinate on the first axis, the first coordinate corresponding to a start time of the given one of the one or more tasks and the second coordinate corresponding to an end time of the given one of the one or more tasks.

In some example embodiments, transforming the plurality of shapes into a polygon may comprise entering coordinates of left vertices and right vertices of overlapping ones of the plurality of shapes in at least one array; and generating, on the basis of the coordinates entered in the at least one array, a closed path of vertices forming the polygon.

In some example embodiments, entering the coordinates of the left vertices and right vertices of the overlapping ones of the plurality of shapes in the at least one array may comprise creating a first path following left vertices of the plurality of shapes and a second path following right vertices of the plurality of shapes; entering, in a first array and in an order of their appearance along the first path, the coordinates of the left vertices of the overlapping ones of the plurality of shapes; and entering, in a second array and in an order of their appearance along the second path, the coordinates of the right vertices of the overlapping ones of the plurality of shapes.

In some example embodiments, the method may comprise determining that the first coordinate of a left vertex of a first selected one of the plurality of shapes is smaller than the first coordinate of a right vertex of a second selected one of the plurality of shapes, the second selected one of the plurality of shapes adjacent the first selected one of the plurality of shapes along the second axis, and determining that the first coordinate of a right vertex of the first selected one of the plurality of shapes is greater than the first coordinate of a left vertex of the second selected one of the plurality of shapes, thereby determining that the first selected one of the plurality of shapes overlaps the second selected one of the plurality of shapes.

In some example embodiments, entering the coordinates of the left vertices and right vertices of the overlapping ones of the plurality of shapes may comprise starting at least one of the first path and the second path from a selected one of the left vertices of the plurality of shapes, the first coordinate of the selected one of the left vertices being smaller than the first coordinate of remaining ones of the left vertices of the plurality of shapes and the second coordinate of the selected one of the left vertices being smaller than the second coordinate of remaining ones of the left vertices of the plurality of shapes.

In some example embodiments, entering the coordinates of the left vertices and right vertices of the overlapping ones of the plurality of shapes may comprise starting at least one of the first path and the second path from a selected one of the right vertices of the plurality of shapes, the first coordinate of the selected one of the right vertices being greater than the first coordinate of remaining ones of the right vertices of the plurality of shapes and the second coordinate of the selected one of the right vertices being greater than the second coordinate of remaining ones of the right vertices of the plurality of shapes.

In some example embodiments, generating the closed path of vertices may comprise concatenating the first array and the second array to form a third array and generating the closed path on the basis of the coordinates from the third array.

In accordance with another aspect, there is provided a system for visualization of a compute workflow. The system comprises at least one processing unit; and a non-transitory memory communicatively coupled to the at least one processing unit and comprising computer-readable program instructions executable by the at least one processing unit for representing one or more tasks of the compute workflow as a plurality of adjacent shapes in a two-dimensional coordinate system, each shape having a first dimension along a first axis of the two-dimensional coordinate system and a second dimension along a second axis of the two-dimensional coordinate system, the first dimension corresponding to a duration of a given one of the one or more tasks and the second dimension corresponding to an amount of resources used by the given one of the one or more tasks; transforming the plurality of shapes into a polygon; and plotting the polygon in the two-dimensional coordinate system.

In some example embodiments, the computer-readable program instructions may be executable by the at least one processing unit for positioning a first endpoint of each shape at a first coordinate on the first axis and positioning a second endpoint of each shape at a second coordinate on the first axis, the first coordinate corresponding to a start time of the given one of the one or more tasks and the second coordinate corresponding to an end time of the given one of the one or more tasks.

In some example embodiments, the computer-readable program instructions may be executable by the at least one processing unit for entering coordinates of left vertices and right vertices of overlapping ones of the plurality of shapes in at least one array; and generating, on the basis of the coordinates entered in the at least one array, a closed path of vertices forming the polygon.

In some example embodiments, the computer-readable program instructions may be executable by the at least one processing unit for creating a first path following left vertices of the plurality of shapes and a second path following right vertices of the plurality of shapes; entering, in a first array and in an order of their appearance along the first path, the coordinates of the left vertices of the overlapping ones of the plurality of shapes; and entering, in a second array and in an order of their appearance along the second path, the coordinates of the right vertices of the overlapping ones of the plurality of shapes.

In some example embodiments, the computer-readable program instructions may be executable by the at least one processing unit for determining that the first coordinate of a left vertex of a first selected one of the plurality of shapes is smaller than the first coordinate of a right vertex of a second selected one of the plurality of shapes, the second selected one of the plurality of shapes adjacent the first selected one of the plurality of shapes along the second axis, and determining that the first coordinate of a right vertex of the first selected one of the plurality of shapes is greater than the first coordinate of a left vertex of the second selected one of the plurality of shapes, thereby determining that the first selected one of the plurality of shapes overlaps the second selected one of the plurality of shapes.

In some example embodiments, the computer-readable program instructions may be executable by the at least one processing unit for starting at least one of the first path and the second path from a selected one of the left vertices of the plurality of shapes, the first coordinate of the selected one of the left vertices being smaller than the first coordinate of remaining ones of the left vertices of the plurality of shapes and the second coordinate of the selected one of the left vertices being smaller than the second coordinate of remaining ones of the left vertices of the plurality of shapes.

In some example embodiments, the computer-readable program instructions may be executable by the at least one processing unit for starting at least one of the first path and the second path from a selected one of the right vertices of the plurality of shapes, the first coordinate of the selected one of the right vertices being greater than the first coordinate of remaining ones of the right vertices of the plurality of shapes and the second coordinate of the selected one of the right vertices being greater than the second coordinate of remaining ones of the right vertices of the plurality of shapes.

In some example embodiments, the computer-readable program instructions may be executable by the at least one processing unit for concatenating the first array and the second array to form a third array and generating the closed path on the basis of the coordinates from the third array.

Many further features and combinations thereof concerning the present improvements will appear to those skilled in the art following a reading of the instant disclosure.

DESCRIPTION OF THE FIGURES

In the figures.

It will be noted that throughout the appended drawings, like features are identified by like reference numerals.

DETAILED DESCRIPTION

Figure 1:
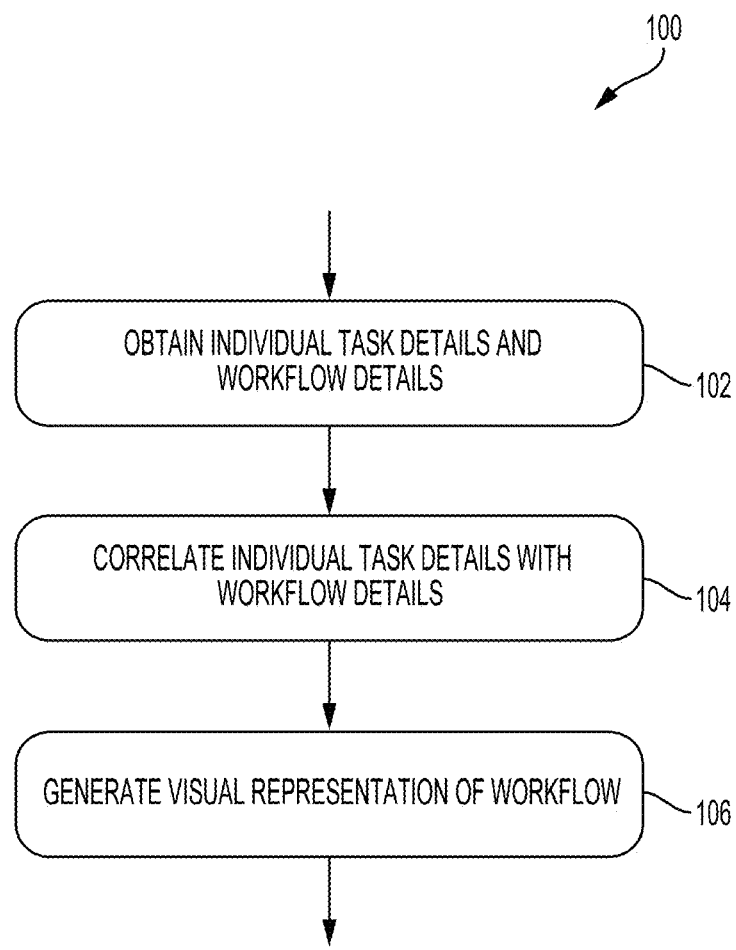
FIG. 1 illustrates a flowchart of an example method for visualization of a compute workflow, in accordance with one embodiment.

Referring to FIG. 1, an example method 100 for visualization of a compute workflow, in accordance with one embodiment, will now be described. As used herein, the term compute workflow refers to a set of interdependent tasks that run in a distributed computing cluster. Workflows can have multiple levels of abstraction. For example, at a high (or workflow) level, a workflow may produce a business-critical report. At another (or stage) level, the workflow can be broken down into multiple stages of computation, each of which may contain dependencies. Each computation stage comprises of a sequence of parallelizable jobs that may run in parallel. Each job executes a series of basic computing tasks (referred to as the low, or task, level). The tasks represent basic units of work that are typically implemented serially on a computing host. For example, in the MapReduce framework, a task may be a single Map task or Reduce task working on one block of data. In other words, tasks are individual containers that run on a compute cluster for a period of time, such that the collective output of a group of tasks operating in parallel accomplishes the goals of a parallelizable job.

At step 102, details about individual low-level tasks and high-level workflows are obtained. The individual task details are then correlated with the workflow details at step 104 and a visual representation of the workflow is generated at step 106. In one embodiment, the visual representation of the workflow comprises graphical elements. In another embodiment, the visual representation of the workflow comprises both graphical and textual elements. As will be discussed further below, the visual representation generated at step 106 spans several levels of abstraction, thereby providing a detailed view of resource utilization in the workflow. The visual representation is rendered in a two-dimensional (or (x, y)) coordinate system with time being shown along a first (or x) axis and the amount of system resources used for each task being shown along the second (or y) axis. The system resources referred to herein include, but are not limited to, Central Processing Unit (CPU) usage, compute container or slot, Random Access Memory (RAM) usage, and network bandwidth usage. When the workflow is executed, several instances of the state of the executed workflow (referred to herein as workflow instances) are saved in memory. For example, the workflow may run each day (on data specific to that day), and each workflow instance corresponds to the run of the workflow on a given day. Using the method 100, the multiple workflow instances can be plotted simultaneously on a common timeline. In this manner, differences between the workflow instances can be highlighted and sources of variation identified.

Figure 2:
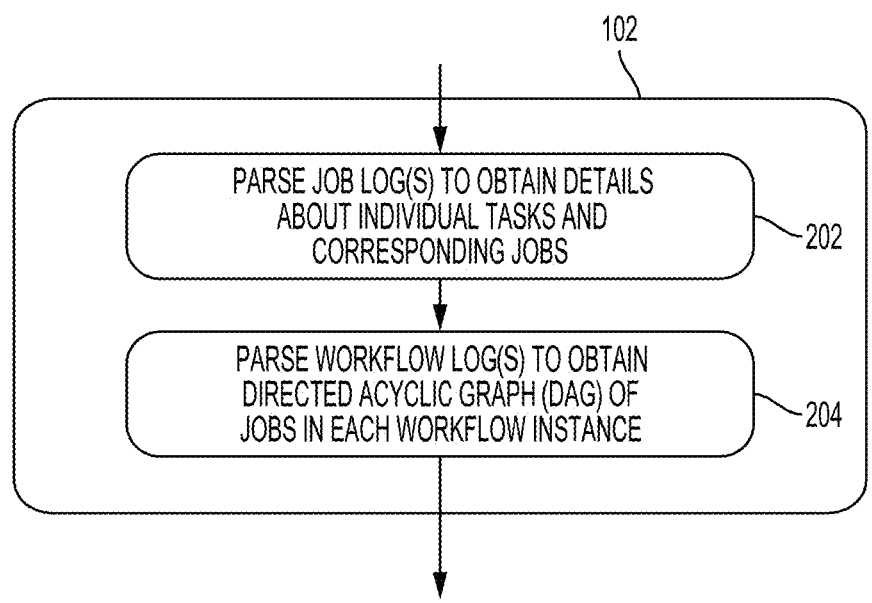
FIG. 2 is a flowchart of the step of FIG. 1 of obtaining individual task details and workflow details.

Referring now to FIG. 2 in addition to FIG. 1, the step 102 comprises the step 202 of parsing one or more job logs to obtain details about individual tasks and corresponding jobs. For this purpose, one or more job logs, such as the job history file produced for every job, are retrieved from memory and parsed. For each task, the task details obtained at step 202 may include, but are not limited to, a start time, a finish time, the name of the computing host on which the task is implemented, a container identifier, a counter, an attempt identifier, a status, and a failure reason for failed or terminated tasks. The step 102 also comprises the step 204 of parsing one or more workflow logs to obtain a workflow description. In one embodiment, the workflow description is a directed acyclic graph (DAG) of jobs in each workflow instance. It should be understood that the order of steps 202 and 204 may be modified. For instance, workflow logs may be parsed and the DAG of jobs obtained prior to parsing job logs to obtain details about individual tasks and corresponding jobs. In some cases, information about the workflow may be stored directly in the task logs, so that both task-level and workflow-level information can be obtained in a single step. Once the individual task details and workflow details have been obtained, these details are correlated at step 104 to associate low-level tasks with high-level workflows and accordingly determine the constituent tasks of each computation stage of the workflow.

For example, in one embodiment, a workflow identifier may be written into each job log at job runtime. When the logs are parsed, the workflow identifiers are extracted and all jobs with the same workflow identifier are grouped together and correlated to the identified workflow. If the workflow comprises multiple conceptual levels of computation, the workflow identifier can allow to correlate the low-level tasks with the position of the task in the overall workflow hierarchy. For example, a single workflow may comprise a sequence of Apache Hive queries. The Hive queries may each span multiple parallelizable compute stages, which contain phases of low-level Map and Reduce tasks. Workflow identifiers can be added to the logs of the low-level compute tasks to identify the stage, query, and overall sequence of queries (top-level workflow) that the Map and Reduce tasks are associated with. Once correlation is completed, the visual representation of the workflow is then generated at step 106 on the basis of the correlation.

Figure 3:
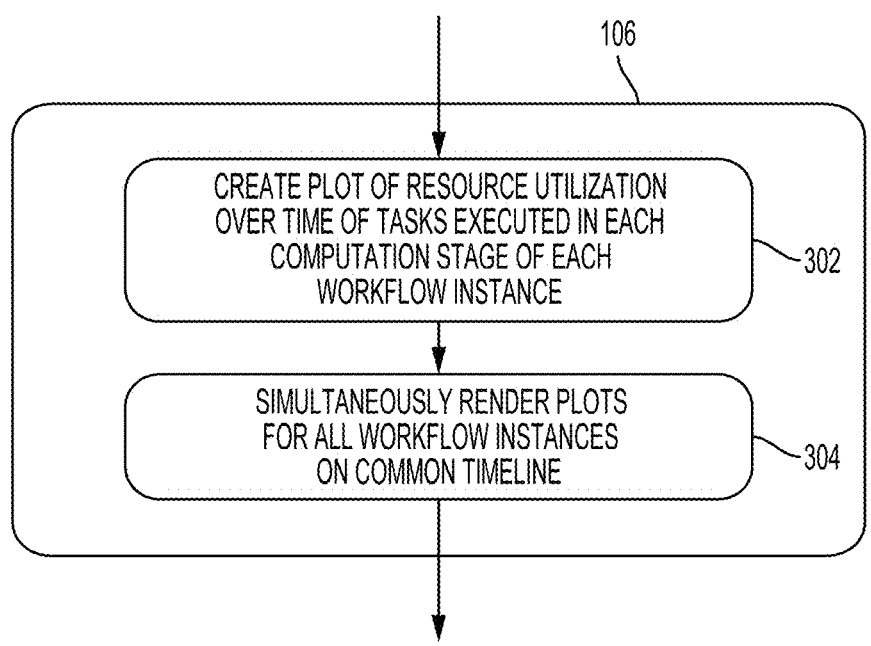
FIG. 3 is a flowchart of the step of FIG. 1 of generating a visual representation of the compute workflow.
Figure 4:
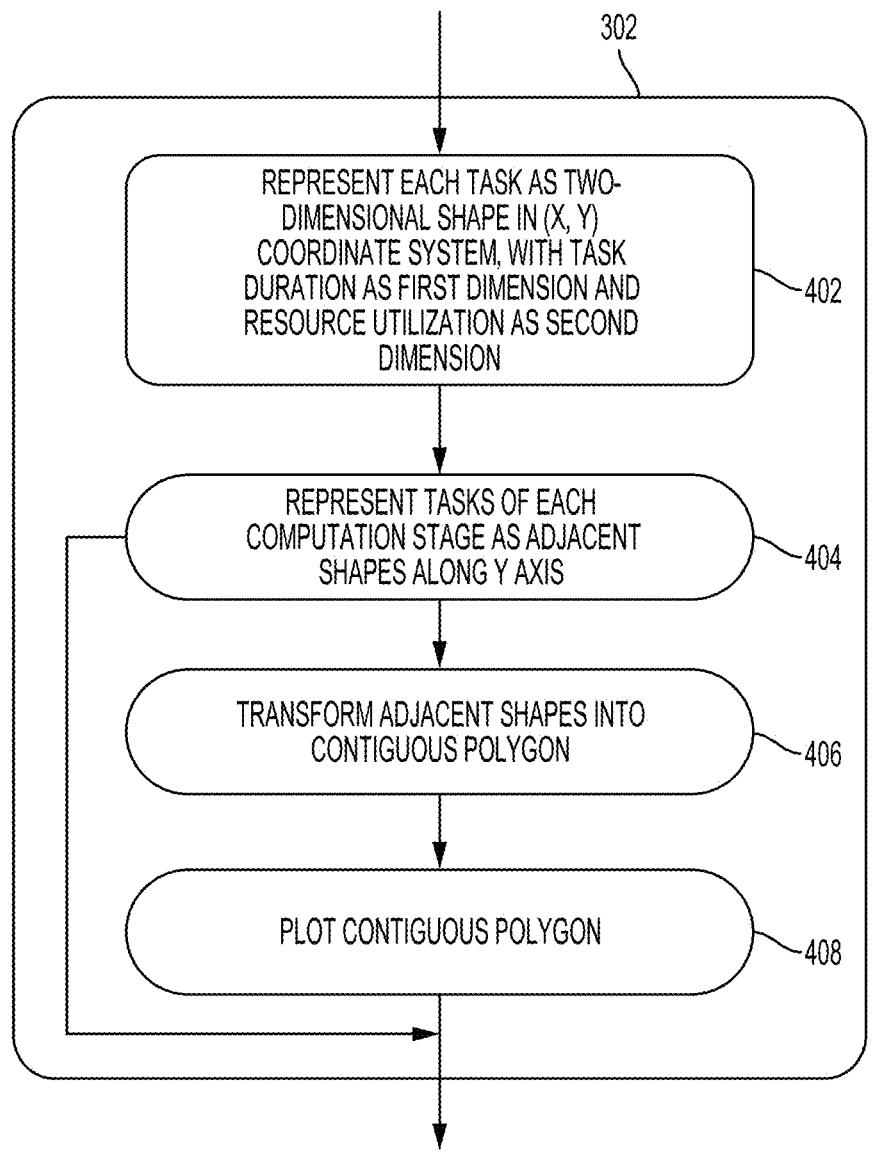
FIG. 4 is a flowchart of the step of FIG. 3 of creating a plot of a resource utilization overt time of tasks executed in each computation stage of each workflow instance.

Referring now to FIG. 3 and FIG. 4, step 106 comprises creating, at step 302, a plot of resource utilization over time of tasks executed in each computation stage of each workflow instance. The computation stages of each workflow instance are plotted beside one another (e.g. from left to right) along the time axis. Plots for all workflow instances are then simultaneously rendered on a common timeline at step 304, with the various workflow instances being plotted side-by-side on common x and y axes in an integrated view. As illustrated in FIG. 4, step 302 comprises, at step 402, representing each task as a graphical element, such as a two-dimensional shape, in the (x, y) coordinate system. The first dimension (i.e. the dimension along the x axis) of the created shape corresponds to the duration of the corresponding task. The second dimension (i.e. the dimension along the y, or resource, axis) of the shape corresponds to the resource utilization of the task. In one embodiment, the shape is a rectangle, in which case the first dimension is the length of the rectangle and the second dimension is the height of the rectangle. In another embodiment, the shape is a line, in which case the first dimension is the length of the line and the second dimension is the position (i.e. the coordinate) of the line on the resource axis.

In one embodiment, each shape is plotted individually in the (x, y) coordinate system, with the endpoints of the shape being positioned on the x axis at points that correspond to the start and end times of the corresponding task. The shape is positioned on the y axis so as to indicate the system resource (for example the compute container or slot) that is assigned to and occupied by the corresponding task on the computing host. This provides an indication of the manner in which tasks are allocated and executed in each computation stage. In particular, the tasks of each computation stage are represented at step 404 as neighboring shapes that are adjacent along the y axis. The shapes created can be ordered (or stacked) along the y axis according to the start times of the corresponding tasks, the durations of the corresponding tasks, or the computing host on which the corresponding tasks are executed. The tasks may also be color-coded, with different colors being assigned to different tasks (e.g. a first color for Map tasks and a second color for Reduce tasks). In addition, each computation stage can be demarcated using an outline, such as a rectangle. In one embodiment, for any given computation stage, the outline delimits the beginning (or start time) of the earliest task and the end (or end time) of the last task to finish. In another embodiment, for any given computation stage, the outline delimits a time at which the job, which executes the tasks, is submitted and a time at which the job is completed. Representing the tasks as adjacent to one another along the y axis allows to readily obtain the total number of tasks associated with any given computation stage.

It should be understood that each task can be represented as both graphical element(s) (or shapes) and textual element(s). In this case, the textual element(s) may comprise one or more of the task details obtained at step 202 of FIG. 2. For example, the textual element(s) may indicate the counters of each task, including but not limited to the amount of memory, CPU, and garbage collection time performed by each task. The textual element(s) may be presented in response to a user selecting a plotted shape presented on a suitable output device, such as a screen. Selection may be performed using an input device, such as a touchscreen, a mouse, or the like (not shown).

Figure 5:
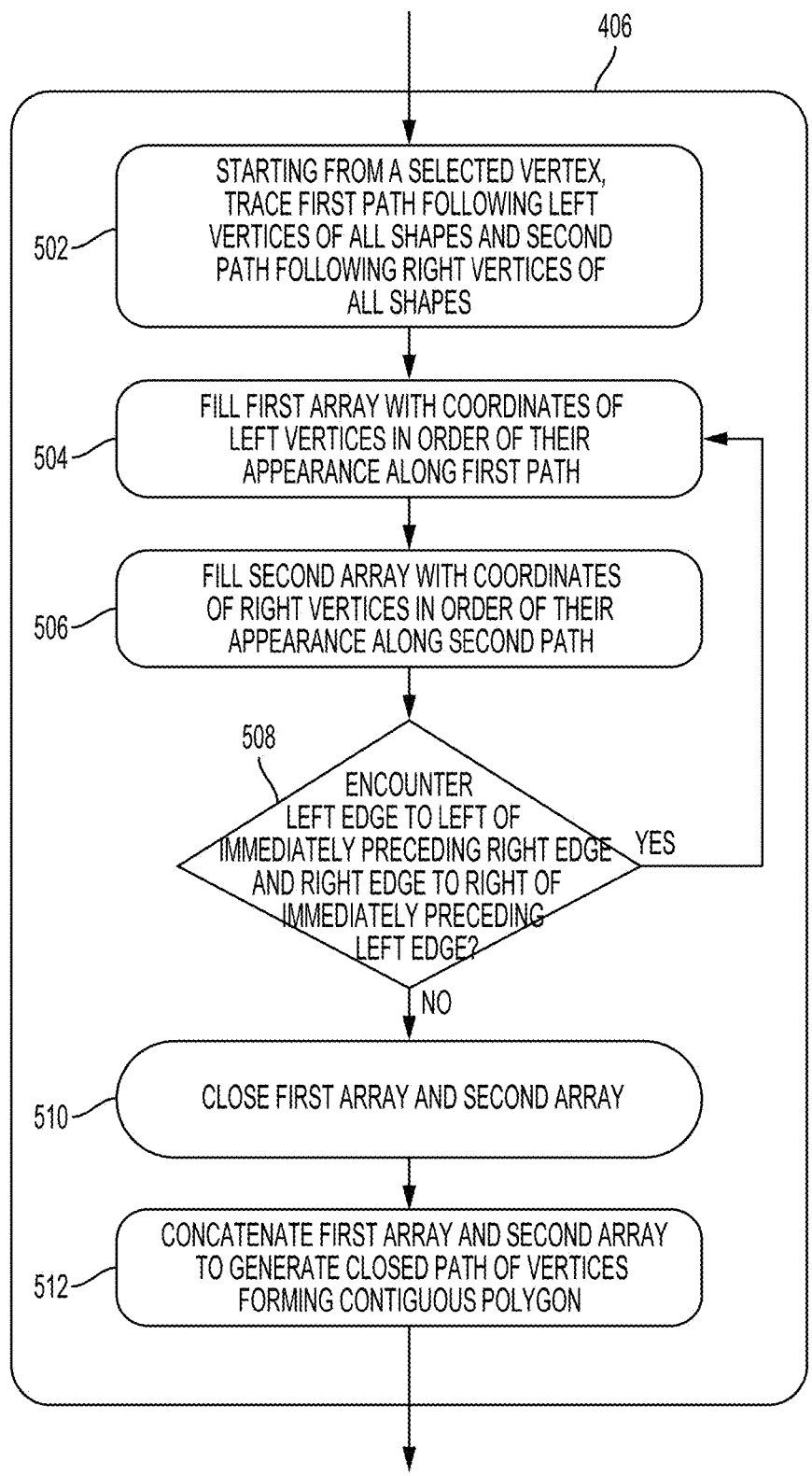
FIG. 5 is a flowchart of the step of FIG. 4 of transforming adjacent shapes into a contiguous polygon.

Referring now to FIG. 5 in addition to FIG. 4, in one embodiment, the adjacent shapes created at step 404 are transformed at step 406 into a contiguous polygon. This can be achieved using the knowledge of the start and stop times of all tasks for which shapes have been created at step 402, as obtained from the task details discussed above with reference to FIG. 2. The contiguous polygon is then plotted at step 408 (rather than plotting individual shapes, as described above). Step 406 comprises the step 502 of tracing a first path following the left vertices of all the shapes created at step 402 and tracing a second path following the right vertices of all shapes. In one embodiment, the first path and the second path are traced starting from a selected vertex having the smallest (x, y) coordinates. In another embodiment, the first path and the second path are traced starting from a selected vertex having the largest (x, y) coordinates. The next step 504 is then to sequentially fill a first array with coordinates of the left vertices in the order of their appearance along the first path. At step 506, a second array is sequentially filled with coordinates of the right vertices in the order of their appearance along the second path. It should be understood that the order of steps 504 and 506 may be modified. Steps 504 and 506 may also be performed simultaneously. It should also be understood that instead of a first and a second array, a single array may be used. In one embodiment, coordinates of the vertices encountered along the first and second path may be provided in separate columns or rows of a multi-dimensional array. In another embodiment, the first path is prepended to the array and the second path is appended to the same array.

Every time a given left vertex (which belongs to a given left edge of a current shape) is encountered along the first path, the next step 508 is to assess whether the given left edge is to the left of the right edge of a shape that immediately precedes (along the y axis) the current shape and whether the right edge of the current shape is to the right of the left edge of the immediately preceding shape. This is equivalent to assessing whether a left vertex having a coordinate along the x (or time) axis (referred to herein as the x coordinate) that is smaller than the x coordinate of the immediately preceding right vertex and whether a right vertex having an x coordinate greater than the x coordinate of the immediately preceding left vertex is encountered along the first path. In other words, step 508 assesses whether two shapes overlap by assessing whether the start time of the current shape is smaller than the finish time of the immediately preceding shape and the finish time of the current shape is greater than the start time of the immediately preceding shape. If the result of the assessment performed at step 508 is positive, meaning that the shapes overlap, steps 504, 506, and 508 are repeated. Otherwise, the next step 510 is to close the first array and the second array. The two arrays are then concatenated at step 512 to generate a closed path of vertices, which forms the contiguous polygon.

Figure 6:
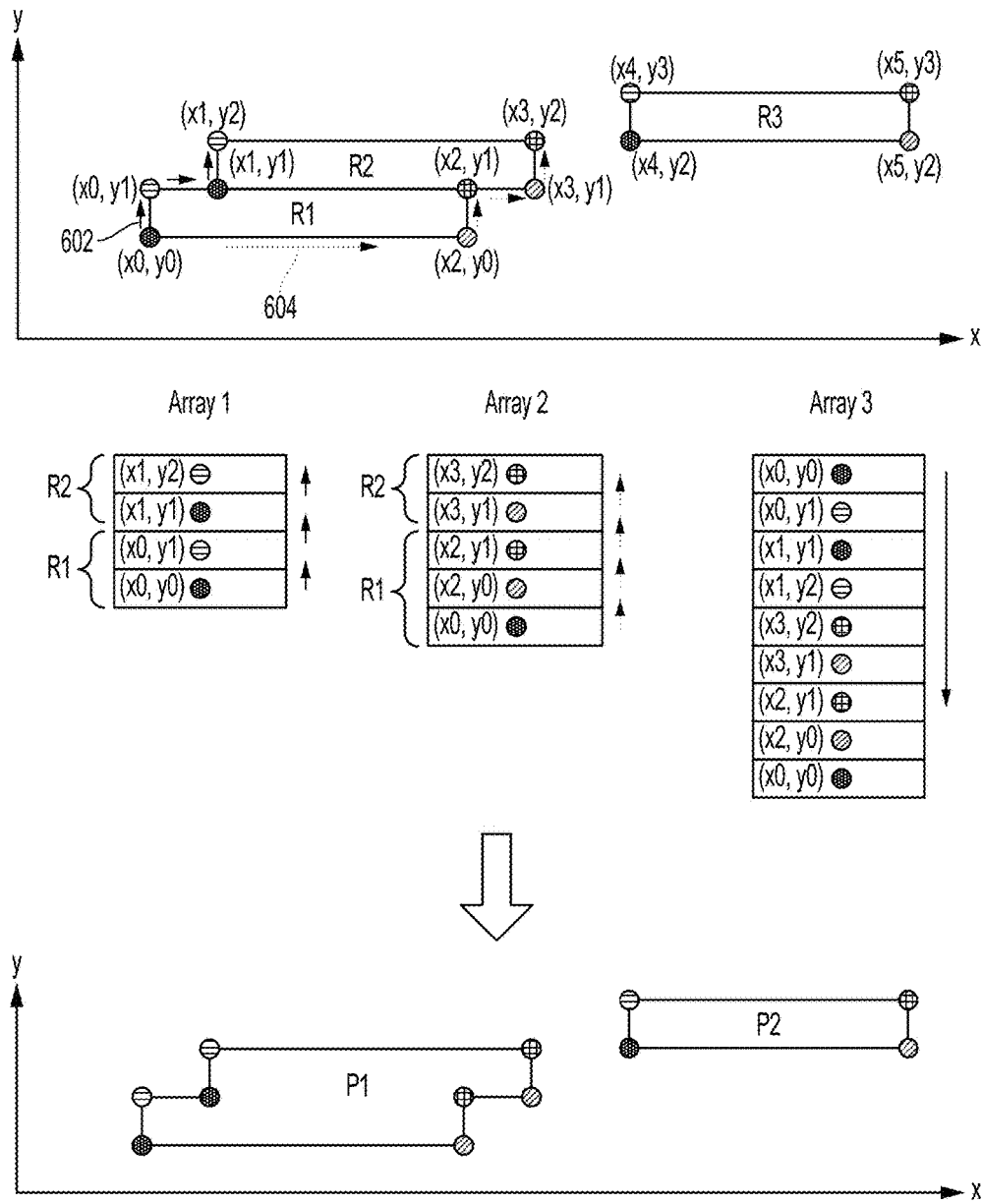
FIG. 6 illustrates an example implementation of the step of FIG. 4 of transforming adjacent shapes into a contiguous polygon.

FIG. 6 illustrates an example implementation of the step 406 of FIG. 4 of transforming adjacent shapes into a contiguous polygon. FIG. 6 shows three rectangles R1, R2, and R3 of a given computation stage, with each rectangle representing in the (x, y) coordinate system the resource utilization over time of a corresponding task. It can be seen that rectangles R1 and R2 are stacked along the y axis and overlap along the x axis. Rectangle R3 does not overlap with any of the rectangles R1, R2. It should be understood that, for a given computation stage, non-overlapping rectangles can be present when the computing cluster is busy performing unrelated tasks and resources for the current computation stage are temporarily unavailable. The two overlapping rectangles R1 and R2 are transformed into a first polygon P1 and the rectangle R3 is transformed into a second polygon P2. For this purpose, a first array and a second array, respectively labelled "Array 1" and "Array 2" in FIG. 6, are created. The vertex having the smallest (x, y) coordinates, namely the vertex with coordinates (x0, y0), is used as a starting point from which a first path 602 following the left vertices of rectangles R1, R2, and R3 is traced. Starting from the vertex with coordinates (x0, y0), a second path 604 following the right vertices of rectangles R1, R2, and R3 is also traced. As discussed above, the first path and/or the second path can be started from a vertex other than the one having the smallest (x, y) coordinates. For example, the first path and/or the second path can be started from the vertex having the largest (x, y) coordinates. As can be seen from FIG. 6, the left vertices of rectangle R1 have coordinates (x0, y0) and (x0, y1) and the right vertices of rectangle R1 have coordinates (x2, y0) and (x2, y1). For rectangle R2, the left vertices have coordinates (x1, y1) and (x1, y2) and the right vertices have coordinates (x3, y1) and (x3, y2). For rectangle R3, the left vertices have coordinates (x4, y2) and (x4, y3) and the right vertices have coordinates (x5, y2) and (x5, y3).

The coordinates of the left vertices, which are encountered along the first path, are entered into the first array in the order of their appearance along the first path. The coordinates of the right vertices, which are encountered along the second path, are entered into the second array in the order of their appearance along the second path. As discussed above, every time a given left vertex (which belongs to a given left edge of a current shape) is encountered along the first path, it is assessed whether the given left edge is to the left of the right edge of a shape that immediately precedes (along the y axis) the current shape and whether the right edge of the current shape is to the right of the left edge of the immediately preceding shape. As discussed above, this indicates whether the shape (i.e. the rectangle) to which the given left vertex belongs overlaps the immediately preceding rectangle. In the example of FIG. 6, upon following the first path and reaching the left vertex of rectangle R3, which has coordinates (x4, y2), it is determined that the left edge of rectangle R3 is to the right of the immediately preceding right edge (i.e. the right edge of rectangle R2). It can therefore be concluded that the rectangle R3 does not overlap rectangle R2. The coordinates (x4, y2) of the vertex of rectangle R3 (and any other coordinates of rectangle R3) are therefore not entered into any of the first and second array and the first and second arrays closed. Step 406 of FIG. 4 is then repeated for a new set of rectangles, using the coordinates (x4, y2) of rectangle R3 as a point of origin for the first path and/or the second path.

Upon closing of the arrays, the coordinates (x0, y0), (x0, y1), (x1, y1), and (x1, y2) have therefore been entered into the first array and the coordinates (x0, y0), (x2, y0), (x2, y1), (x3, y1), and (x3, y2) into the second array, as shown in FIG. 6. The first and second arrays are then concatenated to form a closed path of vertices. In one embodiment where the first array and the second array have a single dimension, the first and second arrays are concatenated along the dimension to result in a concatenated array also having a single dimension. In particular, the first array or the second array is reversed prior to concatenation of the arrays so that traversing the concatenated array in order results in each vertex being traversed in a contiguous path along the newly formed contiguous polygon. FIG. 6 illustrates one possible array (labelled "Array 3" and referred to herein as A3) resulting from concatenation of "Array 1" (referred to herein as A1) and "Array 2" (referred to herein as A2), with A3=[A1, reverse(A2)]. It should be understood that other possible implementations include: A3=[A2, reverse(A1)]; A3=[reverse(A1), A2]; and A3=[reverse(A2), A1]. Using the coordinates found in the concatenated array, the contiguous polygon P1 is plotted to represent the stacked rectangles R1 and R2 in the (x, y) coordinate system. The non-overlapping rectangle R3 is plotted as the polygon P2, which has the same dimensions as rectangle R3.

Figure 7A:
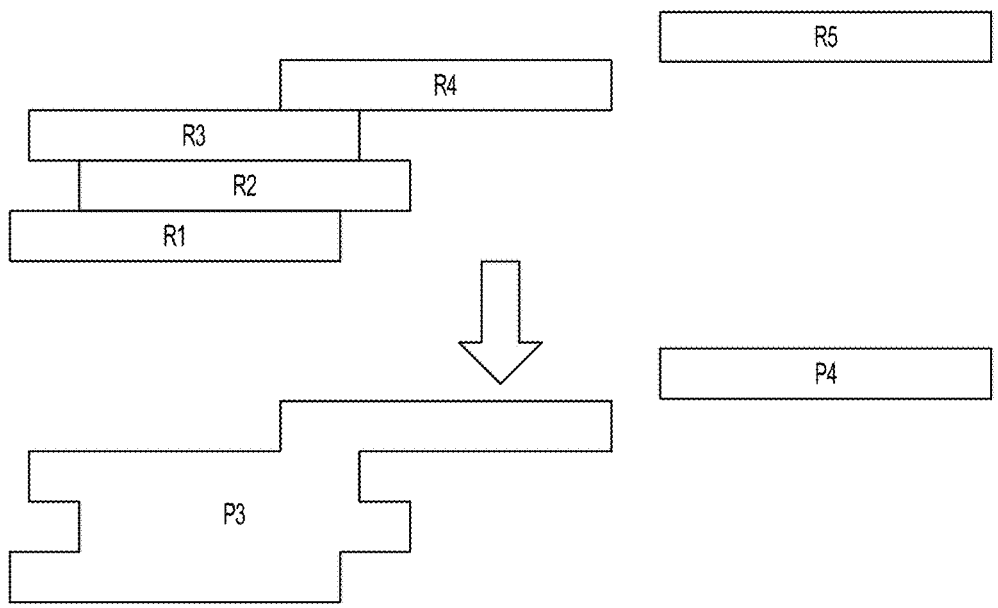
FIG. 7A illustrates a contiguous polygon, in accordance with a first embodiment.
Figure 7B:
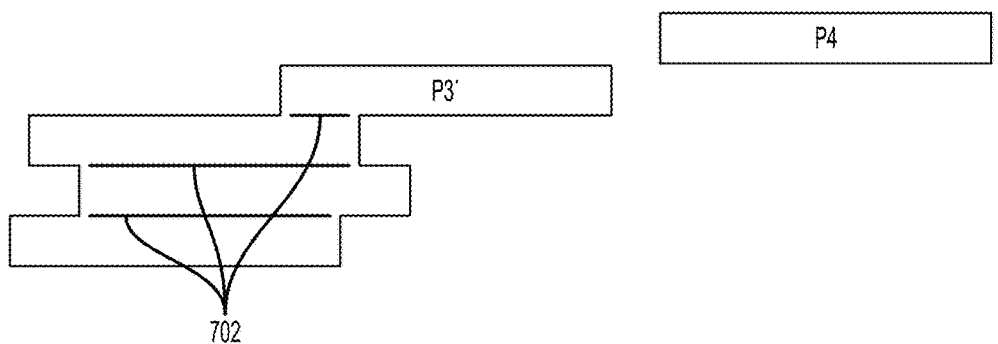
FIG. 7B illustrates a contiguous polygon, in accordance with a second embodiment.

FIG. 7A shows an example where the step 404 of FIG. 5 of transforming adjacent shapes into a contiguous polygon is used to transform four stacked rectangles R1, R2, R3, and R4 and a non-overlapping rectangle R5, in accordance with a first embodiment. The rectangles R1, R2, R3, and R4 are transformed into a first polygon P3 and the rectangle R5 into a second polygon P4 having the same dimensions as rectangle R5. FIG. 7B shows an example where step 404 of FIG. 5 is used to transform the rectangles R1, R2, R3, R4, and R5, in accordance with a second embodiment. The rectangles R1, R2, R3, R4 are transformed into a first polygon P3' and the rectangle R5 into the polygon P4. In the embodiment of FIG. 7B, the polygon P3' comprises lines 702, which are used to separate the individual rectangles R1, R2, R3, and R4. In one embodiment, the lines 702 are plotted in a vectorized fashion.

Figure 8:
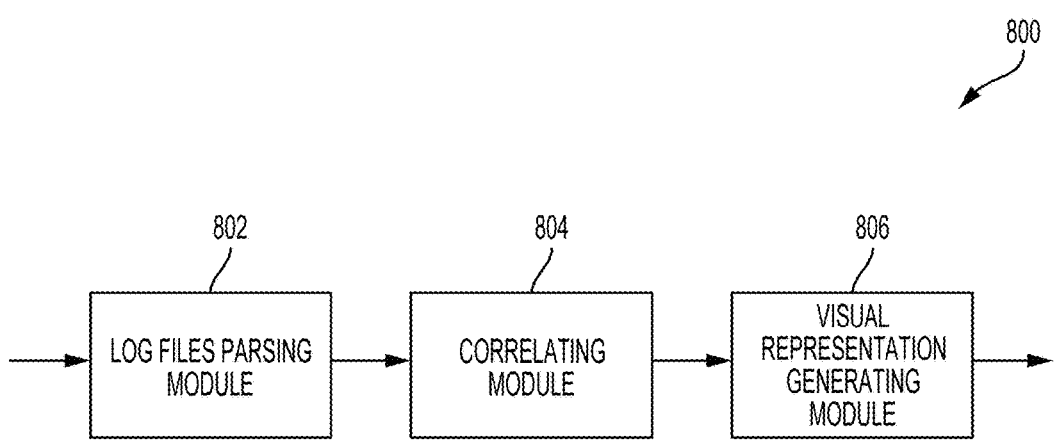
FIG. 8 is a block diagram of an example system for visualization of a compute workflow, in accordance with one embodiment.

Referring now to FIG. 8, an example system 800 for visualization of a compute workflow, in accordance with one embodiment, will now be described. The system 800 implements the method described above with reference to FIG. 1, FIG. 2, FIG. 3, FIG. 4, and FIG. 5. For this purpose, the system 800 comprises a log files parsing module 802, a correlating module 804, and a visual representation generating module 806.

Figure 9:
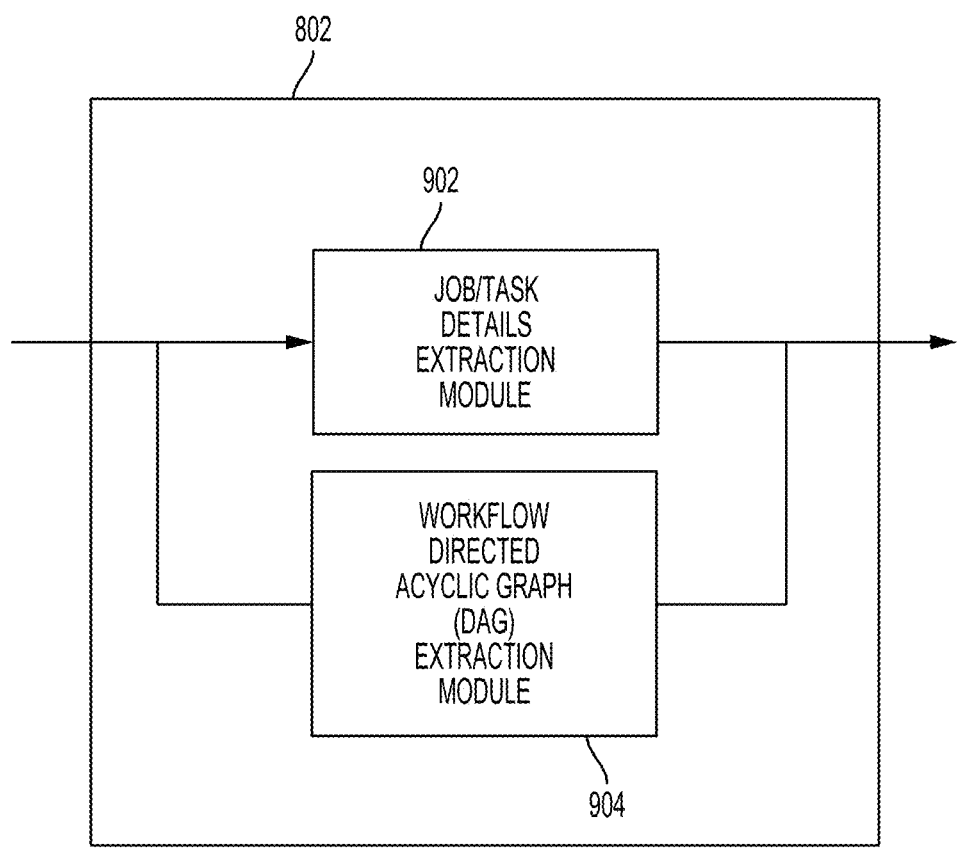
FIG. 9 is a block diagram of the log files parsing module of FIG. 8.

Referring to FIG. 9 in addition to FIG. 8, the log files parsing module 802 comprises a job/task details extraction module 902 and a workflow directed acyclic graph (DAG) extraction module 906. The job/task details extraction module 902 parses one or more job logs to obtain details about individual tasks and corresponding jobs. The workflow DAG extraction module 906 parses one or more workflow logs to obtain the DAG of jobs in each workflow instance. The correlation module 804 then correlates the individual task details with the workflow details in order to determine the constituent tasks of each computation stage of each workflow instance.

Figure 10:
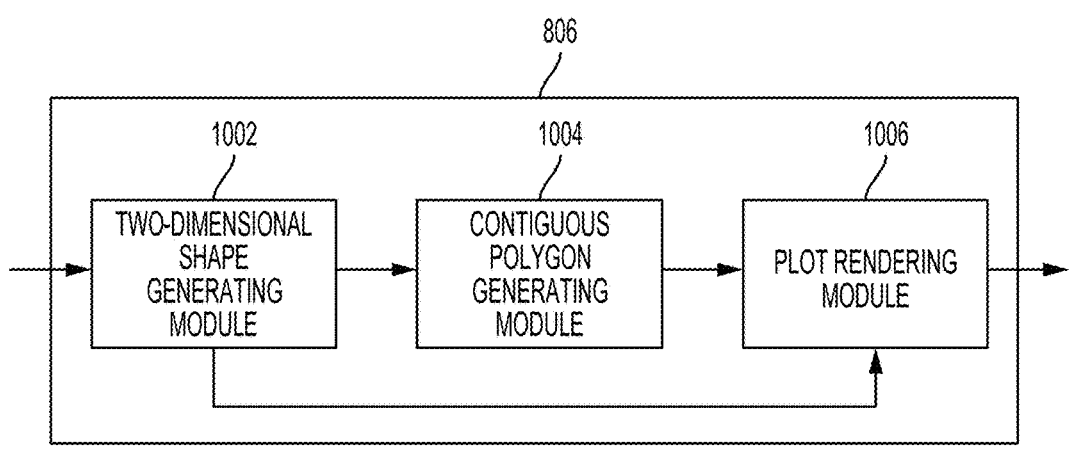
FIG. 10 is a block diagram of the visual representation generating module of FIG. 8.

Referring to FIG. 10, the visual representation generating module 806 comprises a two-dimensional shape generating module 1002, an optional contiguous polygon generating module 1004, and a plot rendering module 1006. The two-dimensional shape generating module 1002 creates a plot of a resource utilization over time of tasks executed in each computation stage of each workflow instance. In particular, the two-dimensional shape generating module 1002 creates a two-dimensional shape, such as a rectangle or line, that is representative of each task in a two-dimensional (or (x, y)) coordinate system. The shape is created so as to have a first dimension along the x axis and a second dimension along the y axis. The first dimension corresponds to a duration of the task that the shape represents and the second dimension corresponds to a resource utilization of the task. The two-dimensional shape generating module 1002 then represents the tasks of each computation stage as adjacent (or stacked) shapes along the y axis. In one embodiment, the contiguous polygon generating module 1004 transforms the stacked shapes into a contiguous polygon. For this purpose and as discussed above with reference to FIG. 5, the contiguous polygon generating module 1004 fills at least one array (in one embodiment two arrays) with the (x, y) coordinates of the shapes created by the two-dimensional shape generating module 1002 until the shapes no longer overlap. The contiguous polygon generating module 1004 then concatenates the two arrays to generate a closed path of vertices that forms the contiguous polygon. It should be understood that the concatenation step need not occur when a single array is used instead of a first and a second array, as discussed above. The plot rendering module 1006 then generates a plot of the workflow visualization for all workflow instances and all computation stages. This is achieved by plotting, for each workflow instance and each computation stage thereof, non-overlapping shapes along with the contiguous polygon(s) generated by the contiguous polygon generating module and simultaneously rendering the plots for all workflow instances on a common timeline.

Figure 11:
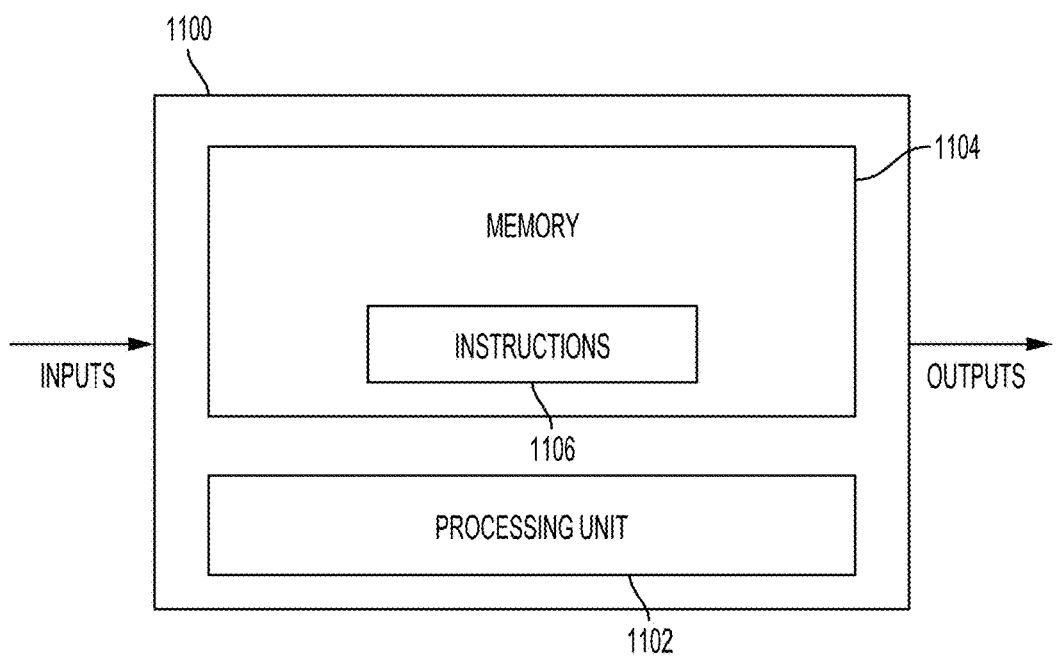
FIG. 11 is a block diagram of an example computing device for implementing the system of FIG. 8.

FIG. 11 is an example embodiment of a computing device 1100 for implementing the system 800 described above with reference to FIG. 8, FIG. 9, and FIG. 10. The computing device 1100 comprises a processing unit 1102 and a memory 1104 which has stored therein computer-executable instructions 1106. The processing unit 1102 may comprise any suitable devices configured to cause a series of steps to be performed such that instructions 1106, when executed by the computing device 1100 or other programmable apparatus, may cause the functions/acts/steps specified in the methods described herein to be executed. The processing unit 1102 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 1104 may comprise any suitable known or other machine-readable storage medium. The memory 1104 may comprise non-transitory computer readable storage medium, for example, but not limited to, an electronic, magnetic, optical, electromagnetic, infrared, or semiconductor system, apparatus, or device, or any suitable combination of the foregoing. The memory 1104 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1104 may comprise any storage means (e.g., devices) suitable for retrievably storing machine-readable instructions 1106 executable by processing unit 1102.

Using the proposed method and system for compute workflow visualization, a historical comparison of workflow instances can be obtained. Simultaneous presentation of multiple levels of details concerning task, stage, and workflow resource usage over time can also be obtained. Identification of anomalous performance can therefore be facilitated. For example, issues, such as delayed tasks, long-running tasks, inconsistent resource allocation, and the like, can be conveyed. This in turn reduces the workload required to compare resource usage across multiple computation stages.

Figure 12:
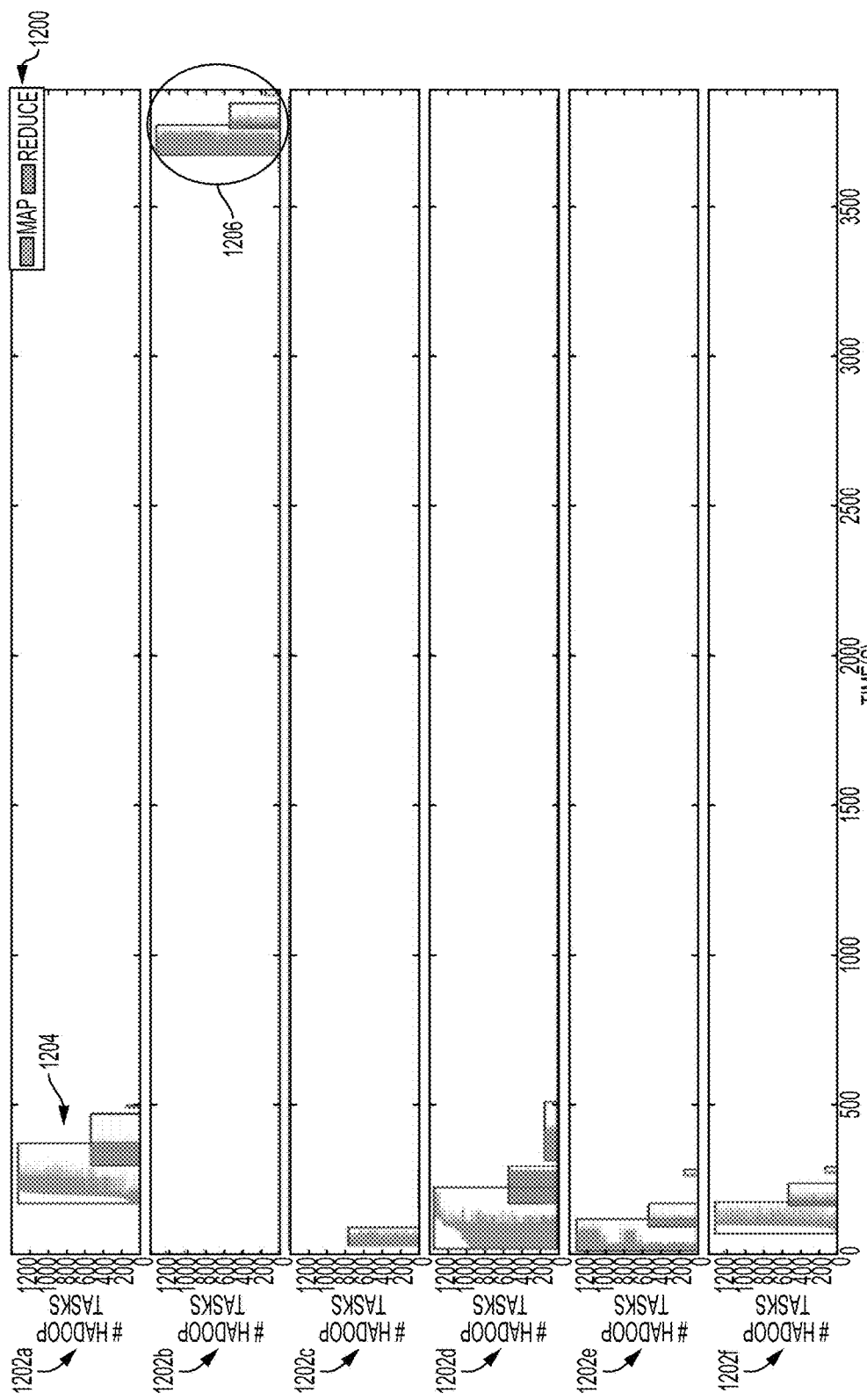
FIG. 12 shows a plot of resource utilization over time for six instances of a compute workflow, including a workflow instance with delayed tasks, in accordance with one embodiment.

For example, FIG. 12 illustrates a resource utilization plot 1200, where tasks are executed in various instances 1202a, 1202b, 1202c, 1202d, 1202e, 1202f of a given compute workflow. Each workflow instance, such as workflow instance 1202a, comprises a computation stage 1204. In the illustrated embodiment, each computation stage 1204 comprises a first sub-stage of Map tasks and a second sub-stage of Reduce tasks. The origin of the time (or x) axis is positioned to correspond to the moment at which the first computation stage (namely the computation stage of workflow instance 1202e in the embodiment of FIG. 12) was submitted to the computing cluster. The various workflow instances 1202a, 1202b, 1202c, 1202d, 1202e, 1202f execute substantially the same Map and Reduce tasks on different data blocks and at different points in time (for example on different days). The plot 1200 allows to view the multiple workflow instances 1202a, 1202b, 1202c, 1202d, 1202e, 1202f simultaneously so as to highlight differences therebetween. In particular, it can be seen from plot 1200 that the tasks 1206 executed in the second workflow instance 1202b are delayed by about an hour compared to instances 1202b, 1202c, 1202d, 1202e, 1202f (i.e. compared to other moments at which the workflow was executed), with respect to the time at which the first compute job was submitted.

Figure 13:
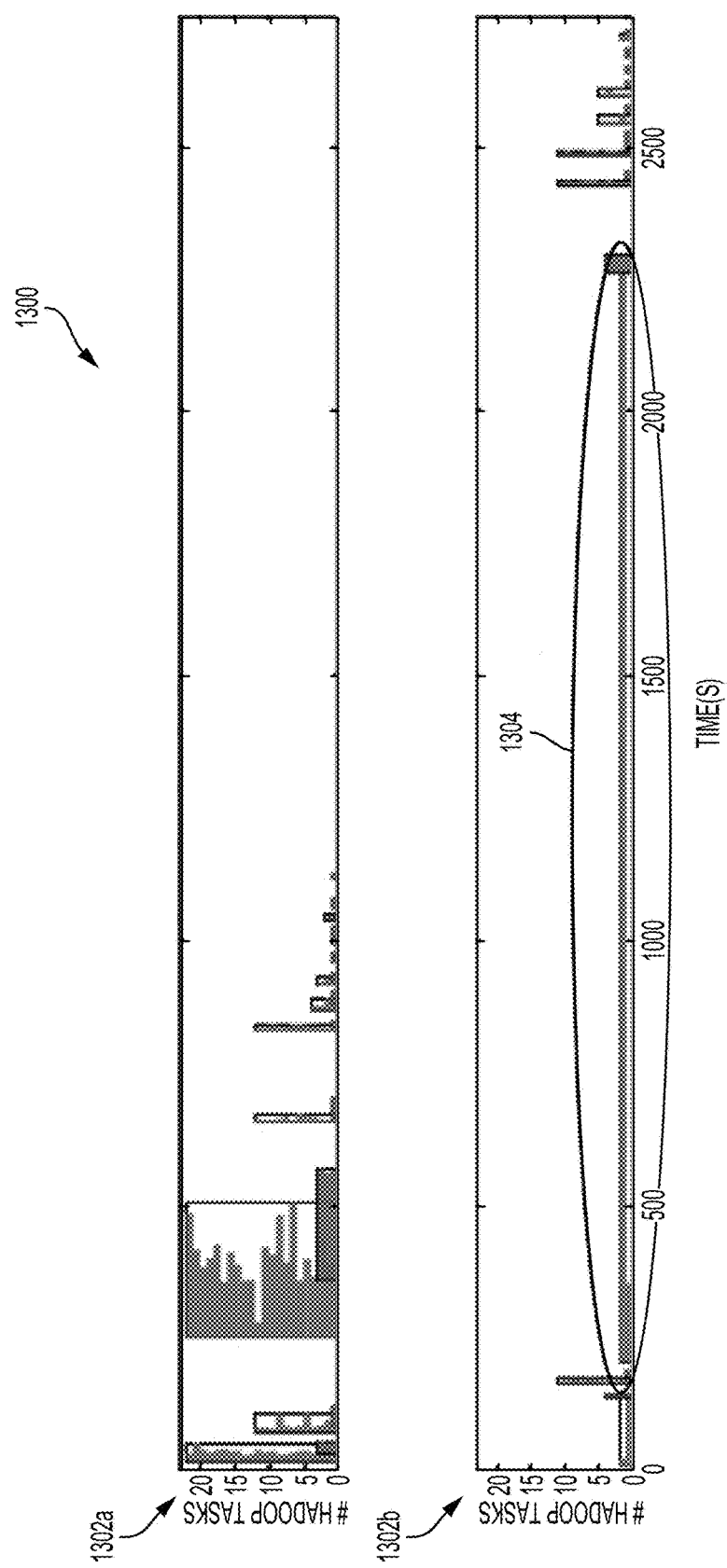
FIG. 13 shows a plot of resource utilization over time for multiple instances of a compute workflow, including a workflow instance with an anomalous long running task, in accordance with one embodiment.

FIG. 13 illustrates a plot 1300 of resource utilization over time for a first workflow instance 1302a and a second workflow instance 1302b. It can be seen that an anomalous long running Map task 1304 is executed in the second workflow instance 1302b. The long running Map task 1304 may result from a missing dependency in the workflow orchestration node.

It should be understood that, although the visual representations shown in FIG. 12 and FIG. 13 generally represent computation stages that run in series, computation stages that run in parallel can also be visualized using the method and system described herein. In one embodiment, for sub-stages that run in parallel, details of the corresponding tasks (i.e. the corresponding two-dimensional shapes) are plotted on top of one another in an overlapping configuration. In this embodiment, the top-level shape has a translucency that permits viewing details of the underlying shape(s). For example, for the workflow instance 1302a of FIG. 13, one may observe Reduce tasks that slightly overlap with Map tasks because the Reduce tasks are configured to start when a given number (90% in the example cluster of FIG. 13) of the Map tasks have completed. Because the Map and Reduce phases tend to have a small amount of overlap, it is then possible to plot these phases as overlapping with little loss of information. It should, however, be understood that whether an overlapping representation of sub-stages is appropriate depends on the configuration of the compute tasks.

Figure 14:
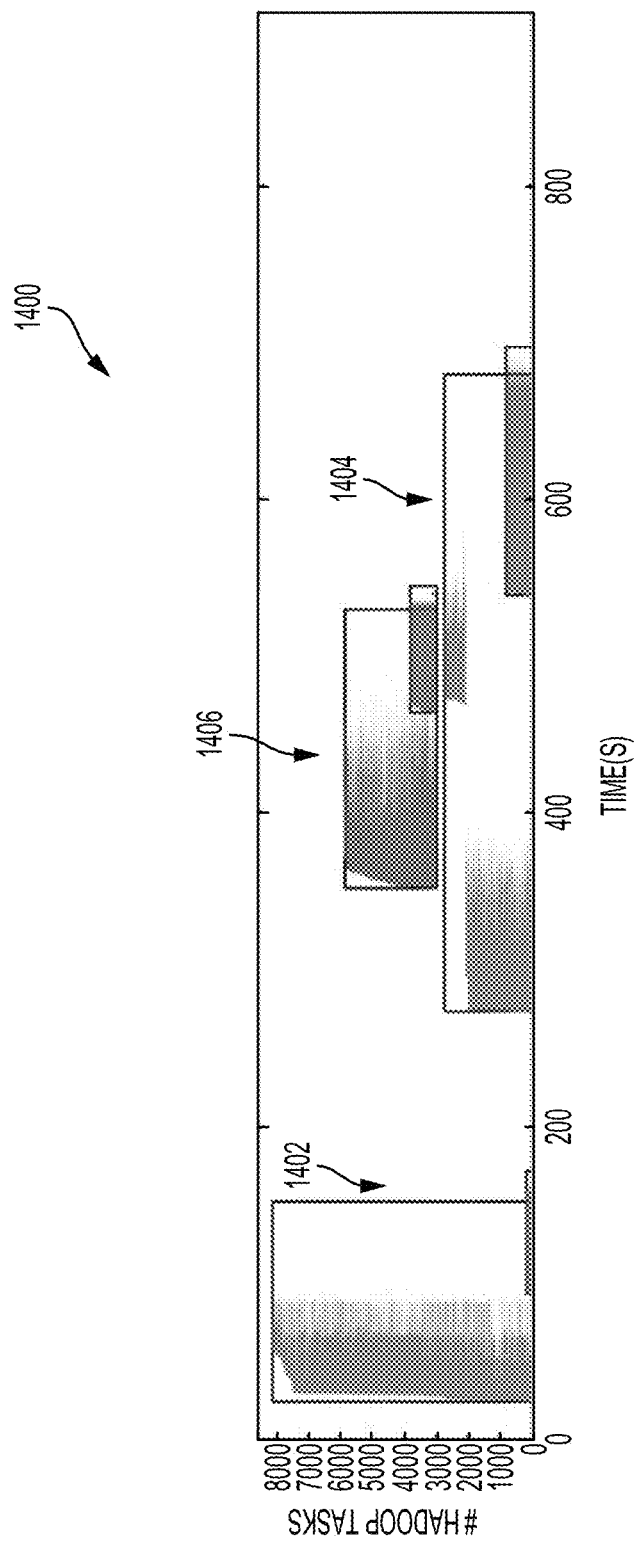
FIG. 14 shows a plot of resource utilization over time for a given instance of a compute workflow, the workflow instance comprising both serially-executing and parallel-executing computation stages, in accordance with one embodiment.

In another embodiment, when different computation stages run in parallel and have much overlap in their timespans, details of the corresponding tasks may be stacked on top of one another. The task details may also be plotted in a different color. This is illustrated in FIG. 14, which shows a plot 1400 of a workflow instance comprising computation stages 1402, 1404, and 1406, each stage 1402, 1404 or 1406 consisting of a first sub-stage (not shown) of Map tasks and a second sub-stage (not shown) of Reduce tasks. Stages 1402 and 1404 and stages 1402 and 1406 run in series. Stages 1404 and 1406 run in parallel. The task details of computation stages 1406 and 1404 are stacked on top of one another along the resource axis.

In yet another embodiment (not shown), shapes for overlapping stages may be plotted in a first available and non-overlapping fashion, moving from left-to-right on the plot, with the internal task spans being plotted from bottom-to-top. In particular, in this embodiment, the first stage is represented as illustrated herein (see, for example, FIG. 14) and the next stage is represented by iteratively plotting the timespan of each corresponding task. The timespan of each task is plotted by filling the first available space that is not currently occupied by a shape that was plotted in a preceding step.

In another embodiment (not shown), information from multiple workflow instances can be combined into a single plot. In other words, the time spans of compute tasks for one workflow instance can be plotted in one color (or pair of colors, e.g. for Map and Reduce phases), and the time spans of compute tasks for other workflow instances can be plotted in other color(s) (or pair(s) of colors) on the same plot. The overlap between task shapes can be plotted using any one of the stacked configuration, the translucent and overlapping configuration, and the first available and non-overlapping configuration discussed above. A user interface provided for rendering such a plot may allow the user to select which workflow instances are plotted together. The effect of one workflow instance on another can then be readily determined.

Figures 15A, 15B:
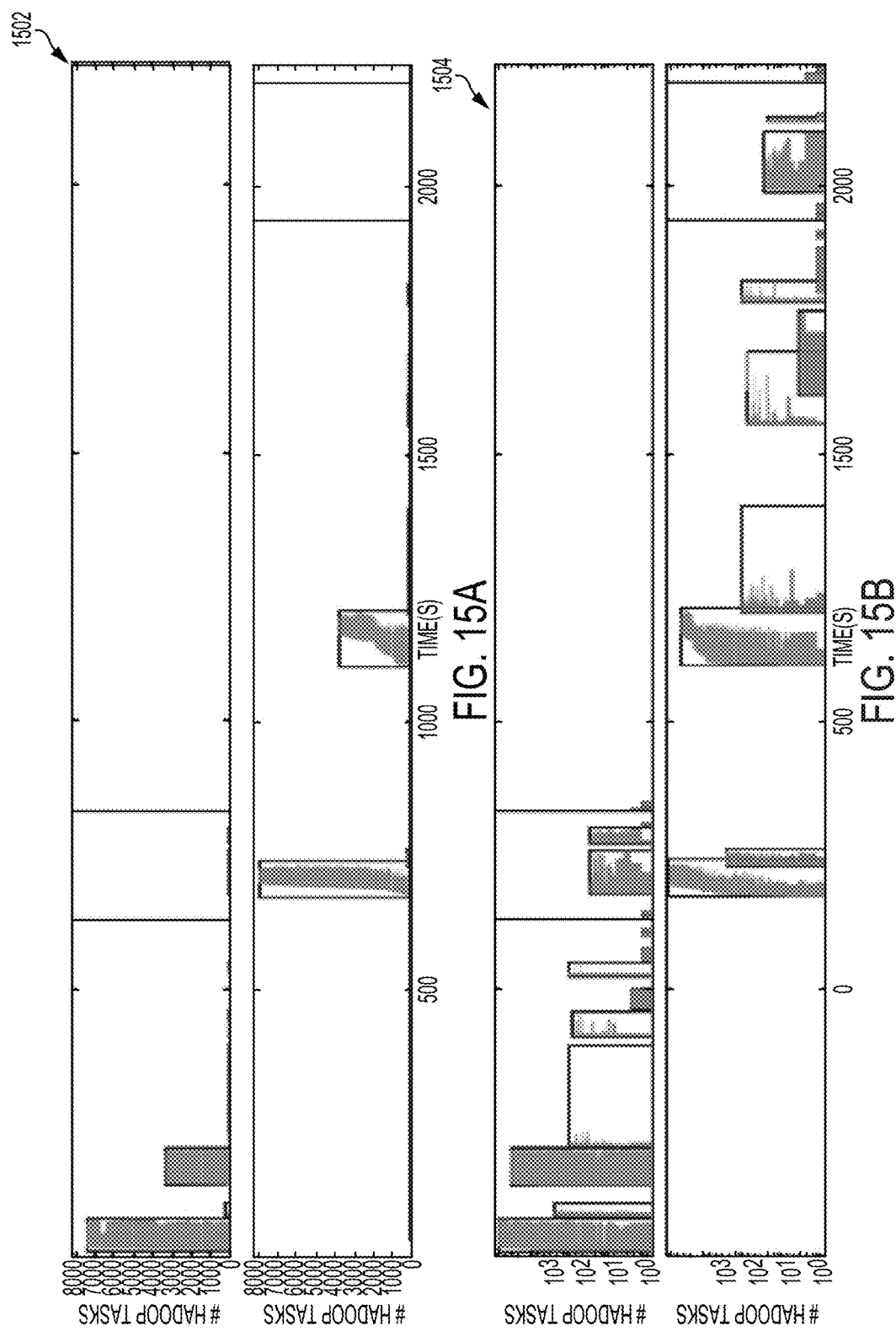
FIG. 15A shows, in linear scale, a plot of resource utilization over time for two instances of a compute workflow, in accordance with one embodiment.
FIG. 15B show the plot of FIG. 15A in logarithmic scale.

It should be understood that, in some embodiments, the resource axis may be plotted on a logarithmic scale in order to facilitate viewing of jobs utilizing few resources. This is illustrated in FIG. 15A, which shows a plot 1502 of task resource utilization over time in linear scale, and FIG. 15B, which shows, as a plot 1504, the plot 1502 with the resource axis in logarithmic scale.

In one embodiment, a method for visualization of a compute workflow comprises representing one or more tasks of the compute workflow as a plurality of adjacent shapes in a two-dimensional coordinate system, each shape having a first dimension along a first axis of the two-dimensional coordinate system and a second dimension along a second axis of the two-dimensional coordinate system, the first dimension corresponding to a duration of a given one of the one or more tasks and the second dimension corresponding to an amount of resources used by the given one of the one or more tasks, transforming the plurality of shapes into a polygon, and plotting the polygon in the two-dimensional coordinate system.

Representing the one or more tasks comprises positioning a first endpoint of each shape at a first coordinate on the first axis and positioning a second endpoint of each shape at a second coordinate on the first axis, the first coordinate corresponding to a start time of the given one of the one or more tasks and the second coordinate corresponding to an end time of the given one of the one or more tasks.

Transforming the plurality of shapes into a polygon comprises entering coordinates of left vertices and right vertices of overlapping ones of the plurality of shapes in at least one array, and generating, on the basis of the coordinates entered in the at least one array, a closed path of vertices forming the polygon.

Entering the coordinates of the left vertices and right vertices of the overlapping ones of the plurality of shapes in the at least one array comprises creating a first path following left vertices of the plurality of shapes and a second path following right vertices of the plurality of shapes, entering, in a first array and in an order of their appearance along the first path, the coordinates of the left vertices of the overlapping ones of the plurality of shapes, and entering, in a second array and in an order of their appearance along the second path, the coordinates of the right vertices of the overlapping ones of the plurality of shapes.

It is further determined that the first coordinate of a left vertex of a first selected one of the plurality of shapes is smaller than the first coordinate of a right vertex of a second selected one of the plurality of shapes, the second selected one of the plurality of shapes adjacent the first selected one of the plurality of shapes along the second axis, and that the first coordinate of a right vertex of the first selected one of the plurality of shapes is greater than the first coordinate of a left vertex of the second selected one of the plurality of shapes, thereby determining that the first selected one of the plurality of shapes overlaps the second selected one of the plurality of shapes.

Entering the coordinates of the left vertices and right vertices of the overlapping ones of the plurality of shapes comprises starting at least one of the first path and the second path from a selected one of the left vertices of the plurality of shapes, the first coordinate of the selected one of the left vertices being smaller than the first coordinate of remaining ones of the left vertices of the plurality of shapes and the second coordinate of the selected one of the left vertices being smaller than the second coordinate of remaining ones of the left vertices of the plurality of shapes.

Entering the coordinates of the left vertices and right vertices of the overlapping ones of the plurality of shapes comprises starting at least one of the first path and the second path from a selected one of the right vertices of the plurality of shapes, the first coordinate of the selected one of the right vertices being greater than the first coordinate of remaining ones of the right vertices of the plurality of shapes and the second coordinate of the selected one of the right vertices being greater than the second coordinate of remaining ones of the right vertices of the plurality of shapes.

Generating the closed path of vertices comprises concatenating the first array and the second array to form a third array and generating the closed path on the basis of the coordinates from the third array.

In one embodiment, a system for visualization of a compute workflow, the system comprises at least one processing unit, and a non-transitory memory communicatively coupled to the at least one processing unit and comprising computer-readable program instructions executable by the at least one processing unit for representing one or more tasks of the compute workflow as a plurality of adjacent shapes in a two-dimensional coordinate system, each shape having a first dimension along a first axis of the two-dimensional coordinate system and a second dimension along a second axis of the two-dimensional coordinate system, the first dimension corresponding to a duration of a given one of the one or more tasks and the second dimension corresponding to an amount of resources used by the given one of the one or more tasks, transforming the plurality of shapes into a polygon, and plotting the polygon in the two-dimensional coordinate system.

The computer-readable program instructions are executable by the at least one processing unit for positioning a first endpoint of each shape at a first coordinate on the first axis and positioning a second endpoint of each shape at a second coordinate on the first axis, the first coordinate corresponding to a start time of the given one of the one or more tasks and the second coordinate corresponding to an end time of the given one of the one or more tasks.

The computer-readable program instructions are executable by the at least one processing unit for entering coordinates of left vertices and right vertices of overlapping ones of the plurality of shapes in at least one array, and generating, on the basis of the coordinates entered in the at least one array, a closed path of vertices forming the polygon.

The computer-readable program instructions are executable by the at least one processing unit for creating a first path following left vertices of the plurality of shapes and a second path following right vertices of the plurality of shapes, entering, in a first array and in an order of their appearance along the first path, the coordinates of the left vertices of the overlapping ones of the plurality of shapes, and entering, in a second array and in an order of their appearance along the second path, the coordinates of the right vertices of the overlapping ones of the plurality of shapes.

The computer-readable program instructions are executable by the at least one processing unit for determining that the first coordinate of a left vertex of a first selected one of the plurality of shapes is smaller than the first coordinate of a right vertex of a second selected one of the plurality of shapes, the second selected one of the plurality of shapes adjacent the first selected one of the plurality of shapes along the second axis, and determining that the first coordinate of a right vertex of the first selected one of the plurality of shapes is greater than the first coordinate of a left vertex of the second selected one of the plurality of shapes, thereby determining that the first selected one of the plurality of shapes overlaps the second selected one of the plurality of shapes.

The computer-readable program instructions are executable by the at least one processing unit for starting at least one of the first path and the second path from a selected one of the left vertices of the plurality of shapes, the first coordinate of the selected one of the left vertices being smaller than the first coordinate of remaining ones of the left vertices of the plurality of shapes and the second coordinate of the selected one of the left vertices being smaller than the second coordinate of remaining ones of the left vertices of the plurality of shapes.

The computer-readable program instructions are executable by the at least one processing unit for starting at least one of the first path and the second path from a selected one of the right vertices of the plurality of shapes, the first coordinate of the selected one of the right vertices being greater than the first coordinate of remaining ones of the right vertices of the plurality of shapes and the second coordinate of the selected one of the right vertices being greater than the second coordinate of remaining ones of the right vertices of the plurality of shapes.

The computer-readable program instructions are executable by the at least one processing unit for concatenating the first array and the second array to form a third array and generating the closed path on the basis of the coordinates from the third array.

The above description is meant to be for purposes of example only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

Although illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Based on such understandings, the technical solution of the present invention may be embodied in the form of a software product. The software product may be stored in a non-volatile or non-transitory storage medium, which can be a read-only memory (ROM), a magnetic disk, an optical disc, a flash drive, or any other suitable storage media or device.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. The software product includes a number of instructions that enable a computer device (personal computer, server, or network device) to execute the methods provided in the embodiments of the present invention. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The structure illustrated is thus provided for efficiency of teaching the present embodiment. The present disclosure may be embodied in other specific forms without departing from the subject matter of the claims.

Also, one skilled in the relevant arts will appreciate that although the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A method for visualization of a compute workflow, the method comprising:

obtaining, at a computing device, workflow data indicative of one or more jobs executed in each computation stage of each instance of the compute workflow by parsing one or more workflow loci files to obtain a directed acyclic graph representative of a sequence of the one or more jobs and job data indicative of one or more tasks executed by each of the one or more jobs by parsing one or more job loci files to obtain an identification of the one or more tasks;

associating, at the computing device, each of the one or more tasks with a corresponding computation stage;

generating, at the computing device, for each instance of the compute workflow, a visual representation of a resource utilization over time of each of the one or more tasks executed in each computation stage; and rendering, on an output device of the computing device, the visual representation for multiple instances of the compute workflow on a common timeline.

2. The method of claim 1, wherein generating the visual representation comprises representing each of the one or more tasks as a shape having a first dimension along a first axis of a two-dimensional coordinate system and a second dimension along a second axis of the two-dimensional coordinate system, the first dimension corresponding to a duration of each of the one or more tasks and the second dimension corresponding to an amount of resources used by each of the one or more tasks.

3. The method of claim 2, wherein generating the visual representation comprises, for each computation stage, positioning multiple ones of the shape adjacent to one another along the second axis according to one of a start time of each of the one or more tasks, the duration of each of the one or more tasks, and a computing host on which each of the one or more tasks is implemented.

4. The method of claim 3, wherein generating the visual representation comprises generating, for each instance of the compute workflow, a plot comprising multiple graphical elements simultaneously rendered in the two-dimensional coordinate system, each graphical element representative of a given computation stage and comprising the multiple ones of the shape positioned adjacent to one another along the second axis.

5. The method of claim 4, wherein computation stages running in series are rendered as graphical elements positioned adjacent to one another along the first axis and computation stages running in parallel are rendered as graphical elements positioned adjacent to one another along the second axis.

6. The method of claim 4, wherein rendering the visual representation for multiple instances of the compute workflow on a common timeline comprises simultaneously rendering multiple ones of the plot in an integrated view.

7. The method of claim 3, wherein generating the visual representation comprises transforming the multiple ones of the shape into a polygon and rendering the polygon in the two-dimensional coordinate system.

8. The method of claim 3, wherein generating the visual representation comprises, for each computation stage, enclosing the multiple ones of the shape with an outline delimiting the start time of an earliest one of the one or more tasks to start and an end time of a last one of the one or more tasks to finish.

9. The method of claim 3, wherein generating the visual representation comprises, for each computation stage, enclosing the multiple ones of the shape with an outline delimiting a submission time for a given one of the one or more jobs executing the one or more tasks and a finish time for the given one of the one or more jobs.

10. The method of claim 2, wherein generating the visual representation comprises representing each of the one or more tasks in the two-dimensional coordinate system with the second axis in logarithmic scale.

11. A computing device for visualization of a compute workflow, the system comprising:
at least one processing unit; and
a non-transitory memory communicatively coupled to the at least one processing unit and comprising computer-readable program instructions executable by the at least one processing unit for:
obtaining workflow data indicative of one or more jobs executed in each computation stage of each instance of the compute workflow by parsing one or more workflow log files to obtain a directed acyclic graph representative of a sequence of the one or more jobs and job data indicative of one or more tasks executed by each of the one or more jobs by parsing one or more job loci files to obtain an identification of the one or more tasks;
associating each of the one or more tasks with a corresponding computation stage;
generating, for each instance of the compute workflow, a visual representation of a resource utilization over time of each of the one or more tasks executed in each computation stage; and
rendering, on an output device of the computing device, the visual representation for multiple instances of the compute workflow on a common timeline.

12. The computing device of claim 11, wherein the computer-readable program instructions are executable by the at least one processing unit for generating the visual representation comprising representing each of the one or more tasks as a shape having a first dimension along a first axis of a two-dimensional coordinate system and a second dimension along a second axis of the two-dimensional coordinate system, the first dimension corresponding to a duration of each of the one or more tasks and the second dimension corresponding to an amount of resources used by each of the one or more tasks.

13. The computing device of claim 12, wherein the computer-readable program instructions are executable by the at least one processing unit for generating the visual representation comprising, for each computation stage, positioning multiple ones of the shape adjacent to one another along the second axis according to one of a start time of each of the one or more tasks, the duration of each of the one or more tasks, and a computing host on which each of the one or more tasks is implemented.

14. The computing device of claim 13, wherein the computer-readable program instructions are executable by the at least one processing unit for generating, for each instance of the compute workflow, a plot comprising multiple graphical elements simultaneously rendered in the two-dimensional coordinate system, each graphical element representative of a given computation stage and comprising the multiple ones of the shape positioned adjacent to one another along the second axis.

15. The computing device of claim 14, wherein the computer-readable program instructions are executable by the at least one processing unit for rendering computation stages running in series as graphical elements positioned adjacent to one another along the first axis and rendering computation stages running in parallel as graphical elements positioned adjacent to one another along the second axis.

16. The computing device of claim 14, wherein the computer-readable program instructions are executable by the at least one processing unit for rendering the visual representation for multiple instances of the compute workflow on a common timeline comprising simultaneously rendering multiple ones of the plot in an integrated view.

17. The computing device of claim 13, wherein the computer-readable program instructions are executable by the at least one processing unit for transforming the multiple ones of the shape into a polygon and rendering the polygon in the two-dimensional coordinate system.

18. The computing device of claim 12, wherein the computer-readable program instructions are executable by the at least one processing unit for representing each of the one or more tasks in the two-dimensional coordinate system with the second axis in logarithmic scale.

19. A non-transitory computer-readable medium storing computer-readable program instructions, which when executed by a computing device, causes the computing device to:
obtain workflow data indicative of one or more jobs executed in each computation stage of each instance of a compute workflow by parsing one or more workflow log files to obtain a directed acyclic graph representative of a sequence of the one or more jobs and job data indicative of one or more tasks executed by each of the one or more jobs parsing one or more job log files to obtain an identification of the one or more tasks;
associate each of the one or more tasks with a corresponding computation stage;
generate for each instance of the compute workflow, a visual representation of a resource utilization over time of each of the one or more tasks executed in each computation stage; and
render on a output device of the computing device the visual representation for multiple instances of the compute workflow on a common timeline.

20. The non-transitory computer-readable medium of claim 19, wherein the computer-readable program instructions, when executed by the computing device, cause the computing device to generate the visual representation by representing each of the one or more tasks as a shape having a first dimension along a first axis of a two-dimensional coordinate system and a second dimension along a second axis of the two-dimensional coordinate system, the first dimension corresponding to a duration of each of the one or more tasks and the second dimension corresponding to an amount of resources used by each of the one or more tasks.

* * * * *